United States Patent Office 3,494,783
Patented Feb. 10, 1970

3,494,783
COATED POLYOLEFIN STRUCTURES
Taro J. Kimura and Alan R. Hurst, Chicago, Ill., assignors to Phillips Petroleum Company, a corporation of Delaware
No Drawing. Filed Dec. 19, 1966, Ser. No. 602,482
Int. Cl. B44d 1/22
U.S. Cl. 117—76                               6 Claims

ABSTRACT OF THE DISCLOSURE

An overcoating composition having improved scuff resistance and suitable for application to polyolefin surfaces to improve the ink and/or adhesive receptivity thereof.

---

This invention relates to the coating of polyolefin structures.

The use of normally solid polymers of 1-olefin hydrocarbons in various structural forms has greatly increased in recent years because of the many advantageous characteristics of said polymers. For example, in the packaging field the normally solid polymers of 1-olefin hydrocarbons are becoming ever more widely employed in the form of sheets, film, tubes, envelopes, bags, flexible bottles, and the like, because of their desirable visual properties, insolubility in many solvents, relatively low cost, flexibility, etc. It is also common practice to coat paper, paperboard, other paper products, and other substrates with thin films of said polymers to prepare packaging materials and other structures which thus acquire many of the desirable attributes of the polymer film. For many of these uses, such as those suggested in the packaging field, it is frequently desirable to add to the polyolefin structure a printing ink and/or an adhesive material. However, conventional printing inks do not adhere strongly to the polyolefin films or other structures and are not usually satisfactory for this purpose without some special treatment of the polyolefin structure. Attempts to solve this problem have been made by compounding special inks that will adhere strongly to the surface of polyolefin structures such as those named above. However, these special inks fail to meet with the approval of the printers, who prefer to use conventional inks. Said special inks also frequently require certain aftertreatments which cannot be carried out on the printing machinery normally employed.

Various treating processes have been proposed in the prior art for improving the ink receptivity and/or the adhesive receptivity of various structures formed of normally solid polymers of 1-olefin. Included among these are the various methods for subjecting the surface of the polyolefin material to an activation treatment, such as a chemical oxidation treatment, a flame treatment, treatment with ozone, exposure to chlorine, treatment with various acids, and/or subjected to various types of electrical bombardment, etc. Such methods do improve the ink and/or adhesive receptivity of the surface of polyolefin structures. Unfortunately, however, experience has shown that said improvement is nearly always of a temporary nature. Unless the printing ink, adhesive, or other coating is applied to the activated surface substantially immediately after activation thereof, it is likely that the coating will not properly adhere.

In the packaging industry it is common practice for a polyolefin structure to be manufactured at one location and used in another. For example, a bottle manufacturer may manufacture the bottle, and then ship same to another manufacturer who fills it with his product. If the bottle manufacturer merely activates the surface of the bottle to render it ink and/or adhesive receptive, it is likely that by the time the user of the bottle receives same, said surface will no longer be ink and/or adhesive receptive. This problem is particularly acute with paper, paperboard, and other paper products which have been coated with polyolefin. Friction, such as occurs in contact with rollers and other machine parts, destroys the activation of the surface. Even in ordinary handling, shipping, and processing, it has been found that the activated surface is lost.

Various overcoating materials have been proposed for application to the activated surfaces of polyolefin structures to provide an overcoat thereon. When using such an overcoating material the printing ink and/or adhesive is then applied to certain selected portions of the overcoated surface as desired. Such an overcoat should be durable, i.e., scuff-resistant. It should also be waterproof or at least water-resistant. In many instances it is desirable that the overcoat have a high gloss. The overcoat must possess good blocking properties and should be chemically stable, i.e., it should not oxidize and become yellow or brittle on aging or on exposure to heat and light. The overcoating composition itself should be mechanically stable, i.e., it should possess good resistance to shear during mixing operations before application and during the steps of applying same. Above all, the overcoat must be ink and/or adhesive receptive. These numerous and varied requirements of both a chemical and physical nature make the problem of providing a satisfactory overcoat for polyolefin structures extremely difficult. Practically all the overcoat compositions of the prior art are deficient in at least one or more of the above properties.

The present invention provides a solution for the above problems and overcomes said difficulties by providing a multi-component overcoat composition, the individual components of which cooperate with each other to obtain a unitary result, a coated polyolefin structure having excellent printing ink and/or adhesive receptivity, and markedly improved scuff resistance.

An object of this invention is to provide an improved overcoat composition for polyolefin structures. Another object of this invention is to provide methods of applying to polyolefin structures the improved overcoat composition of the invention so as to render said structures ink and/or adhesive receptive. Another object of this invention is to provide various polyolefin structures which have been coated with the improved overcoat composition of the invention. Other aspects, objects, and advantages of the invention will be apparent to those skilled in the art in view of this disclosure.

A presently preferred overcoat composition in accordance with this invention is set forth in Table I below.

TABLE I

| Component: | Amount, wt. percent, dry solids basis |
|---|---|
| Rhoplex B–15 [1] | 55 to 61 |
| Rhoplex B–85 [2] | 4.5 to 10 |
| Amberlac 165 [3] | 25 to 29 |
| Paracol 404C [4] | 6 to 8.5 |

[1] An aqueous dispersion of a copolymer of about 83 percent ethyl acrylate, 15 percent methyl methacrylate, and 2 percent methacrylic acid, and containing about 46 percent solids.
[2] An aqueous dispersion of polymethyl methacrylate containing about 38 percent solids.
[3] An ammoniacal aqueous solution containing about 23 weight percent of the ammonium salt of an essentially 1 : 1 copolymer of maleic anhydride and diisobutylene.
[4] An aqueous suspension consisting essentially of a microcrystalline wax having a melting point of 80 to 82° C. and a density of about 0.91 g./cc. at 25° C., a small amount of a soluble polysaccharide such as starch or dextrine and containing about 48 weight percent solids.

Since the overcoating composition is ultimately dried, it is realistic to define the final overcoat composition in terms of dry solids as set forth above. As will be realized by those skilled in the art, the overcoat composition is conveniently applied to the polyolefin structure from an aqueous dispersion. Such a dispersion can be conveniently prepared by combining the above-named four components in amounts sufficient to provide the designated amounts of dry solids, and then adding sufficient water to provide an aqueous dispersion containing from about 10 to about 30, preferably about 15 to 25, weight percent of solids in the dispersion. In all instances the amount of the microcrystalline wax component will be an amount sufficient to supply from 6 to 8.5 weight percent of the solids in the dried overcoat.

We are aware that coating compositions containing one or more of the above-named four components have been utilized in the prior art. However, insofar as we are aware, none of said prior art compositions has contained said components in the amounts set forth above. Particular attention is invited to the high proportion of the microcrystalline wax component. We have found that dried overcoats containing less than 6 weight percent of said wax component (dry solids basis) are definitely deficient in scuff resistance. When the amount of said wax component in the dried overcoat is more than 8.5 weight percent (dry solids basis) there is a definite deterioration in the gloss of the overcoated product.

Further according to the invention, there is provided a method for imparting printing ink receptivity and adhesive receptivity to a polyolefin surface, which method comprises: activating said surface; and applying an overcoating composition onto said activated surface in an amount on a dry basis within the range of from 0.15 to 1.8 pounds per 1000 square feet of said surface, drying said overcoating composition to form an overcoat on said surface; said overcoating composition and said overcoat being substantially as set forth in Table I and in the two preceding paragraphs.

Still further according to the invention, there is provided, as a new product, polyolefin surface having thereon an adherent overcoat consisting essentially of a composition substantially as set forth in Table I above and the two paragraphs immediately following said Table I.

Rhoplex B–15 is a non-ionic emulsion of a relatively soft polymer. This emulsion gives good bonding strength and eliminates failure in printing with high tack inks. It possesses unusually good chemical stability and can withstand considerable shear and mechanical impact. It also is very receptive to most inks and yet offers a controlled ink hold-out.

Rhoplex B–85 is an anionic emulsion of a hard polymer. When used with Rhoplex B–15 it increases the blocking temperature of the dried film. Increasing the ratio of B–85 will gradually increase the blocking temperature to about 200° F. However, when the quantity of B–85 in a B–85/B–15 mixture exceeds 60 percent the film loses its continuity. The B–85 also decreases the bonding strength and ink receptivity of the B–15 if used in large percentages.

The Amberlac 165 increases the resistance to blocking, increases the gloss and in combination with the two Rhoplexes gives good flexibility with resistance to scoring.

In the practice of the invention, it has been found that the use of an anti-foam agent gives much superior results as compared to not using an anti-foam agent. However, the use of an anti-foam agent is not essential in the practice of the invention. Any suitable anti-foaming agent can be used. A presently preferred anti-foam agent is Dow Emulsion AF, a silicone material consisting essentially of about 30 percent of a dimethylpolysiloxane dispersed in water. Another anti-foam agent which can be used is Colloid 581B which consists essentially of a suspension of about 10 weight percent aluminum stearate in a solvent consisting essentially of about 3 parts of liquid polyoxyethylene and one part of $C_{11}$ to $C_{13}$ paraffin hydrocarbon. Another anti-foam agent which can be used in Surfynol 104E which consists essentially of a 50 weight percent solution of 2,4,7,9-tetramethyl-5-decyne-4,7-diol in ethylene glycol. Examples of other anti-foaming agents which can be used in the practice of the invention include NALCO 212, Antifoam B, and Ahco Defoamer 69. Said anti-foam agents, when used, are used in small but effective amounts which are so small they can be ignored from a practical standpoint when considering the dried solids of the overcoat. The amount of anti-foam agent used will usually be less than 0.5 weight percent, preferably 0.02 to 0.05 weight percent, based on the wet aqueous dispersion overcoating composition.

Paracol 404C is a refined microcrystalline wax aqueous emulsion. The incorporation of such a wax emulsion into the overcoating composition prevents picking or plucking of the overcoating, thereby enhancing the slip properties in automatic pasting machines, and greatly improves the scuff resistance. While Paracol 404C is the presently preferred wax emulsion for use in the practice of the invention, said invention is not necessarily limited thereto. Other suitable wax-containing materials which can be used in the practice of the invention include Alwax 253–C and Nopco 1055–M.

If desired, a surfactant possessing wetting and dispersing properties can be used in the overcoating composition of the invention. In some instances the surfactants appear to aid in formation of the continuous overcoat which is formed by deposition of the solids upon drying of the liquid overcoating composition. However, the invention is not limited to the use of a surfactant. Aerosol OT, a surfactant consisting essentially of 75 percent dioctyl sodium sulfosuccinate, 5 percent ethyl alcohol, and 20 percent water, is a presently preferred surfactant for use in the practice of the invention. However, the invention is not limited thereto. Other surfactants which can be used in the practice of the invention include Igepal CO–610, Aerosol AY, and Aerosol MA. Said surfactants, when used, are used in small but effective amounts which are so small they can be ignored from a practical standpoint when considering the dried solids of the overcoat. The amount of surfactant used will usually be less than 0.75 weight percent, preferably 0.2 to 0.5 weight percent, based on the wet aqueous dispersion overcoating composition.

The overcoating compositions of the invention can be prepared in any suitable manner such as by mixing the components thereof in a suitable mixing vessel equipped with means for gentle stirring. Thus, the invention is not limited to any particular mixing procedure or apparatus. The mixing can be and is usually carried out at room temperature. In a presently preferred embodiment of the invention, the Rhoplex B–15 is introduced into the mixing vessel first. The anti-foam agent, if used, is added next. It has been found advantageous to predisperse the anti-foam agent in approximately an equal amount of water and then introduce the resulting dispersion into the mixing vessel with continuous gentle stirring. The Rhoplex B–85 is then introduced into the mixing vessel with gentle stirring. It has been found important to slowly introduce the Amberlac 165 into the mixing vessel containing said other named ingredients, with gentle stirring. If the Amberlac 165 is introduced too rapidly, gellation sometimes occurs. The Paracol 404C is then introduced into the other components in the mixing vessel with gentle stirring. If a surfactant is used, it has been found advantageous to predisperse same into an approximately equal quantity of warm water heated to a temperature of about 40 to 60° C., and then incorporate the resulting dispersion into the other components in the mixing vessel with gentle stirring. Finally, the necessary amount of water (taking into consideration the water previously added in predispersing the anti-foam agent and the surfactant) is then added to the mixing vessel with gentle stirring so as to make up the required amount of water. The pH of the composition would be maintained between about 8.0 to 8.5 during the application of the overcoating composition. Ammonium hydroxide can be used for pH adjustment, if necessary.

In the practice of the invention, the overcoating composition of the invention can be applied to or deposited on the activated surface of a polyolefin structure, e.g., a polyolefin film per se, a polyolefin film extruded or otherwise coated onto a substrate such as the various paper, foil, or cloth products, a sheet of polyolefin, or other polyolefin structure such as bottles, tubes, etc., employing any of the conventional coating techniques. Examples of coating techniques and equipment which can be employed in the practice of the invention include roll coaters such as rotogravure rolls, air knives, brush coaters, trailing knife blade coaters, size presses, immersion coating, roller and roll transfer, reverse roll coating, and others.

The amount of the coating composition applied to the activated surface of the polyolefin structure as an overcoat will depend upon the type of structure, its intended use, and other factors. Since said coating composition is applied in the "wet" liquid state, and since it is the solids which are deposited (upon drying of the liquid coating composition) which forms the overcoat, it is more convenient to express the amount of said overcoat on a dry basis. Generally speaking, the amount of the coating composition applied to the polyolefin surface will usually be an amount, on a dry basis, within the range of from 0.15 to 1.8 pounds per 1000 square feet of surface. Stated another way, the amount of the liquid coating composition applied will be an amount sufficient to deposit, upon drying, from 0.15 to 1.8 pounds of solids per 1000 square feet of surface. When polyolefin structure is a polyolefin film per se or a polyolefin film extruded onto a paper substrate, a frequently preferred range is 0.2 to 1.0 and sometimes more preferably 0.3 to 0.5, pound per 1000 square feet, on a dry basis.

Prior to application of the coating composition to the surface of the polyolefin structure said surface is activated. A variety of methods are known in the prior art for accomplishing this. As used herein and in the claims, unless otherwise specified, the terms "active," "activated," and "activation," when employed in connection with or describing a polyolefin surface, are intended to refer to a surface which has been pretreated by a process such as flame oxidation; chemical oxidation; treatment with a variety of agents such as ozone, chlorine, and various acids; various forms of electrical bombardment or discharge treatments, etc. For example, a flame treatment such as that disclosed in U.S. Patents 2,632,921; 2,683,894; or 2,746,084 can be used. Or, a solution such as that disclosed in U.S. Patent 2,668,134 can be used. Or, preferably, one of the many forms of glow discharge, corona discharge, electrical bombardment, or otherwise termed electrical treatments such as those disclosed in U.S. Patents 2,910,723, 3,018,189; or 2,935,418 can be used. The apparatus and method for discharge treatment disclosed in said Patent 3,018,189 are a presently preferred way of pretreating or activating the polyolefin surface. An activation treatment such as those described above has been found necessary to obtain a tightly adherent overcoat.

The coating composition of the invention is particularly useful in overcoating polyolefin films per se and polyolefin films which have been extruded onto a substrate such as paper. Thus, in the latter instance as one embodiment of the invention, one method according to the invention comprises in combination the steps of: extruding the polyfin onto the paper as a thin film; activating the surface of said film; substantially immediately thereafter coating said activated surface with the overcoating composition of the invention; and drying said overcoated film to deposit thereon an overcoat consisting essentially of the solids contained in said composition. Said individual steps per se can all be carried out employing apparatus and methods known in the prior art and thus individually form no part of the present invention. The methods of this invention reside in the combination of said steps when the coating composition of the invention is employed therein.

For example, the polyolefin can be extrusion coated onto the paper at extrusion temperature within the range of from 500 to 700° F., preferably 550 to 650° F. using any standard extrusion process known to the art. The process is conveniently carried out "in line," i.e., continuously. The polyolefin coated paper is then passed over suitable rollers and through a treating zone, such as the electrical discharge treatment or flame treatments described above, for activation of the polyolefin surface to be overcoated. The coated paper now bearing an activated polyolefin surface is then carried over a series of one or more suitable rollers and the coating composition is applied to said activated surface by means including a rotogravure cylinder which determines the amount of coating composition (wet) applied. After application of the coating composition the paper is carried on suitable rollers and passed through a conventional hot air drying oven operated at a temperature within the range of from 140 to 500° F., preferably 300 to 400° F. From said oven the polyolefin coated and overcoated paper is then carried over a series of rollers to a rewind roller. Throughout the above continuous or "in line" operations the paper is run at speeds within the range of 50 to 3000, preferably 100 to 400 linear feet per minute.

The term "polyolefin" as used herein and in the claims, unless otherwise specified, refers to the normally solid polymers of 1-olefin hydrocarbons. As employed herein and in the claims, unless otherwise specified, the terms "polymer" or "polymers" include homopolymers of said 1-olefins, copolymers of one of said 1-olelns with another of said 1-olefins as a comonomer, and blends of at least one of said copolymers with normally solid polyisobutylene. The polymers of 1-olefins having from 2 to 4 carbon atoms per molecule are usually preferred. Examples of said homopolymers include polyethylene, polypropylene, poly-1-butene, and the like. An example of a copolymer within the above definition is a copolymer of ethylene with 1-butene having from 1 to 10, preferably 1.5 to 5, more preferably 1 to 3 weight percent of the 1-butene comonomer incorporated into the copolymer molecule. Examples of blends of said copolymers with polyisobutylene are those blends containing up to 35 weight percent, preferably from 1 to 35 weight percent of said polyisobutylene and from 99 to 65 weight percent of a copolymer of ethylene with one of said comonomers, e.g., 1-butene. Methods for preparing the above-described polymers are well known to those skilled in the art.

The following examples will serve to further illustrate the invention.

EXAMPLE I

The smoothest side of a web of a 74 lb. paper, 47.5" wide, was extrusion coated in conventional manner with a commercially available polyethylene having a melt index of 3.7 and a density of 0.923 gram per cc. The extrusion temperature was approximately 620° F. and said polyethylene was applied at an average coating weight of 4.66 pounds per 100 square feet of surface. The film was glossy finished. The polyethylene film coated paper thus formed was then fed over a series of rollers into a corona discharge zone operated in conventional manner to activate the surface of said film. The activated polyethylene surface of the thus prepared and treated paper-polyethylene web was then overcoated by applying to said surface an overcoat consisting essentially of

| Component: | Amount, wt. percent, dry solids basis |
|---|---|
| Rhoplex B–15 | 57.7 |
| Rhoplex B–85 | 7.7 |
| Amberlac 165 | 27.4 |
| Paracol 404C | 7.2 |
| | 100.0 |

Said overcoat was applied in conventional manner from an aqueous dispersion using a rotogravure cylinder which applied said dispersion at a rate of about 1.66 pounds per 1000 square feet (wet basis). The aqueous overcoating composition was prepared by mixing said components in amounts sufficient to provide the designated proportions of dry solids and then adding sufficient water to bring the solids content of the aqueous dispersion to 20.4 weight percent. The aqueous dispersion also contained 0.03 weight percent (wet basis) of Dow Chemical Anti-Foam AF, and 0.23 weight percent (wet basis) of Aerosol OT as a surfactant.

The wet overcoated web was then carried by suitable rollers through a two zone hot air drying oven operated at 350° F. in the first zone and 250° F. in the second zone. Upon drying, said aqueous overcoating composition deposited about 0.33 pound per 1000 square feet of solids on said activated surface. The above operations were carried out continuously in line with a paper speed of 275 lineal feet per minute.

The thus deposited solids formed a continuous tightly adherent overcoat which was highly ink receptive as shown by the red ink-adhesive tape test. Said test is a standard test in the printing art and comprises applying a conventional red lithographic ink to the surface, allowing the ink to dry for five minutes, then applying the pressure sensitive tape (Scotch tape) over the dried ink. If the ink is firmly bonded, none is removed by the tape. The appearance of the coated paper when checked in oblique light was excellent. The coated surface was uniformly smooth. There was no "orange peel" or "rivering." The scuff resistance as checked by the fingernail test was excellent. There was no discernible static electricity charge on the paper.

Subsequent commercial printing operations carried out in conventional manner using conventional inks showed the overcoat to be tightly adherent and to have an excellent ink receptivity and retention. The finished surface after the printing operations was characterized by high gloss and excellent scuff resistance. The excellent ink retention was also shown by the fact that the printing ink applied in the commercial printing operations was waterproof. These results are in marked contrast to the results obtained with commercially available coatings such as the various protein-containing coatings which are not waterproof.

EXAMPLE II

A paper similar to that used in Example I was coated with polyethylene in substantially the same manner as in Example I. The thus polyethylene-coated paper was then passed through a corona discharge zone to activate the polyethylene surface, substantially as in Example I. The activated polyethylene surface of the thus prepared and treated paper-polyethylene web was then overcoated by applying to said surface an overcoat consisting essentially of

| Component: | Amount, wt. percent, dry solids basis |
|---|---|
| Rhoplex B–15 | 60.8 |
| Rhoplex B–85 | 8.0 |
| Amberlac 165 | 28.7 |
| Paracol 404C | 2.5 |
| | 100.0 | said overcoat was applied in essentially the same manner as in Example I from an aqueous overcoating composition containing about 28.2 weight percent solids. The amount of said overcoat on a dry basis was about 0.4 pound per 1000 square feet.

Said overcoat was tightly adherent, had good ink adhesion properties, and good appearance, but was markedly inferior in scuff resistance to the overcoat applied to the polyethylene-coated paper of Example I.

The overcoating composition of the invention can be applied to both sides of a substrate. It is also within the scope of the invention to include various colored pigments in the overcoating composition when a colored overcoat is desired. Aqueous solutions of aniline dyes can also be used to obtain color.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:
1. A polyolefin surface having thereon an adherent overcoat having improved scuff resistance and high ink receptivity, said overcoat consisting essentially of the solids deposited upon drying a composition consisting essentially of:
   (a) an amount of an aqueous dispersion of a copolymer of about 83 percent ethyl acrylate, about 15 percent methyl methacrylate, about 2 percent methacrylic acid, and containing about 46 percent solids, which is sufficient to provide from about 55 to about 61 weight percent of said dry solids;
   (b) an amount of an aqueous dispersion of polymethyl methacrylate containing about 38 percent solids which is sufficient to provide from about 4.5 to about 10 weight percent of said dry solids;
   (c) an amount of an ammoniacal aqueous solution containing about 21 weight percent of the ammonium salt of an essentially 1:1 copolymer of maleic anhydride and diisobutylene which is sufficient to provide from about 25 to about 29 weight percent of said solids;
   (d) an amount of an aqueous suspension consisting essentially of a microcrystalline wax having a melting point of about 80 to about 82° C. and a density of about 0.9 gram per cubic centimeter at 25° C., a small amount of soluble polysaccharide, and containing about 47 weight percent solids, which is sufficient to provide from about 6 to about 8.5 weight percent of said dry solids; and
   (e) sufficient water to provide an aqueous dispersion containing from 10 to about 30 weight percent solids.

2. A polyolefin web, adapted to receive and retain thereon printing inks and adhesives, said web comprising: a film of polyolefin; and an adherent overcoat having improved scuff resistance and high ink receptivity deposited on said film in an amount on a dry basis within the range of from 0.15 to 1.8 pounds per 1000 square feet of said film, said overcoat consisting essentially of the solids deposited upon drying a composition consisting essentially of:
   (a) an amount of an aqueous dispersion of a copolymer of about 83 percent ethyl acrylate, about 15 percent methyl methacrylate, about 2 percent methacrylic acid, and containing about 46 percent solids, which is sufficient to provide from about 55 to about 61 weight percent of said dry solids;
   (b) an amount of an aqueous dispersion of polymethyl methacrylate containing about 38 percent solids which is sufficient to provide from about 4.5 to about 10 weight percent of said dry solids;
   (c) an amount of an ammoniacal aqueous solution containing about 21 weight percent of the ammonium salt of an essentially 1:1 copolymer of maleic anhydride and diisobutylene which is sufficient to provide from about 25 to about 29 weight percent of said dry solids;

(d) an amount of an aqueous suspension consisting essentially of a microcrystalline wax having a melting point of about 80 to about 82° C. and a density of about 0.9 gram per cubic centimeter at 25° C., a small amount of a soluble polysaccharide, and containing about 47 weight percent solids, which is sufficient to provide from about 6 to about 8.5 weight percent of said dry solids; and (e) sufficient water to provide an aqueous dispersion containing from about 10 to about 30 weight percent solids.

3. A polyolefin web according to claim 2 wherein said polyolefin is a polymer of ethylene 4. A packaging material, comprising: a paper product base; a coating of a polyolefin applied to at least one surface of said base; and an adherent overcoat present on said polyolefin coating in an amount within the range of from 0.2 to 1.0 pound per 1000 square feet of said surface, said overcoat having improved scuff resistance and high ink receptivity and consisting essentially of the solids deposited upon drying of a composition consisting essentially of:

(a) an amount of an aqueous dispersion of a copolymer of about 83 percent ethyl acrylate, about 15 percent methyl methacrylate, about 2 percent methacrylic acid, and containing about 46 percent solids, which is sufficient to provide from about 55 to about 61 weight percent of said dry solids;

(b) an amount of an aqueous dispersion of polymethyl methacrylate containing about 38 percent solids which is sufficient to provide from about 4.5 to about 10 weight percent of said dry solids;

(c) an amount of an ammoniacal aqueous solution containing about 21 weight percent of the ammonium salt of an essentially 1:1 copolymer of maleic anhydride and diisobutylene which is sufficient to provide from about 25 to about 29 weight percent of said dry solids;

(d) an amount of an aqueous suspension consisting essentially of a microcrystalline wax having a melting point of about 80 to about 82° C. and a density of about 0.9 gram per cubic centimeter at 25° C., a small amount of a soluble polysaccharide, and containing about 47 weight percent solids, which is sufficient to provide from about 6 to about 8.5 weight percent of said dry solids; and (e) sufficient water to provide an aqueous dispersion containing from about 10 to about 30 weight percent solids.

5. A packaging material according to claim 4 wherein said polyolefin is a polymer of ethylene.

6 A polyethylene structure, comprising: a polyethylene base; and an adherent overcoat applied to a surface of said structure in an amount on a dry basis within the range of from 0.15 to 1.8 pounds per 1000 square feet of surface, said overcoat having improved scuff resistance and high ink receptivity and consisting essentially of the solids deposited upon drying of a composition consisting essentially of:

(a) an amount of an aqueous dispersion of a copolymer of about 83 percent ethyl acrylate, about 15 percent methyl methacrylate, about 2 percent methacrylic acid, and containing about 46 percent solids, which is sufficient to provide from about 55 to about 61 weight percent of said dry solids;

(b) an amount of an aqueous dispersion of polymethyl methacrylate containing about 38 percent solids which is sufficient to provide from about 4.5 to about 10 weight percent of said dry solids;

(c) an amount of an ammoniacal aqueous solution containing about 21 weight percent of the ammonium salt of an essentially 1:1 copolymer of maleic anhydride and diisobutylene which is sufficient to provide from about 25 to about 29 weight percent of said dry solids;

(d) an amount of an aqueous suspension consisting essentially of a microcrystalline wax having a melting point of about 80 to about 82° C. and a density of about 0.9 gram per cubic centimeter at 25° C., a small amount of a soluble polysaccharide, and containing about 47 weight percent solids, which is sufficient to provide from about 6 to about 8.5 weight percent of said dry solids; and (e) sufficient water to provide an aqueous dispersion containing from about 10 to about 30 weight percent solids.

References Cited
UNITED STATES PATENTS

| | | | |
|---|---|---|---|
| 2,971,934 | 2/1961 | Brown et al. | 260—28.5 |
| 3,231,411 | 1/1966 | Tyler et al. | |
| 3,297,477 | 1/1967 | Barkis et al. | |
| 3,318,721 | 5/1967 | Lineburg | 260—28.5 X |

WILLIAM D. MARTIN, Primary Examiner

RALPH HUSACK, Assistant Examiner

U.S. Cl. X.R.

117—15, 47, 92, 138.8; 260—28.5, 29.6